Oct. 2, 1951   R. DEVILLERS   2,569,559
ADJUSTABLE POWER-TRANSMISSION
Filed Aug. 13, 1946   2 Sheets-Sheet 1
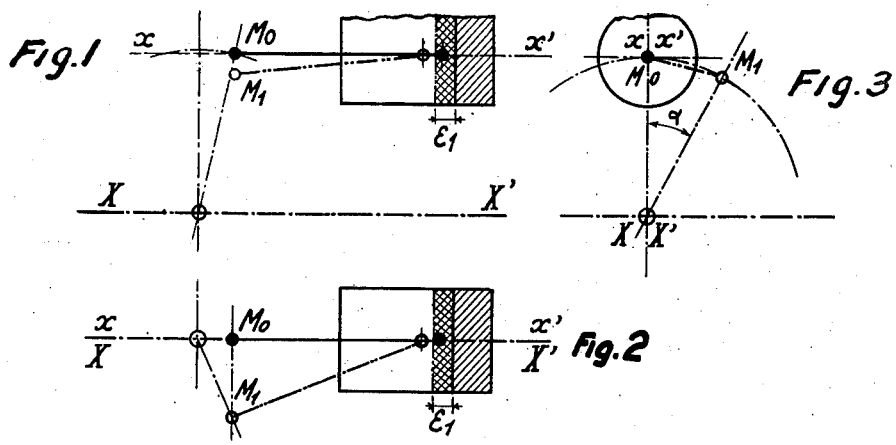
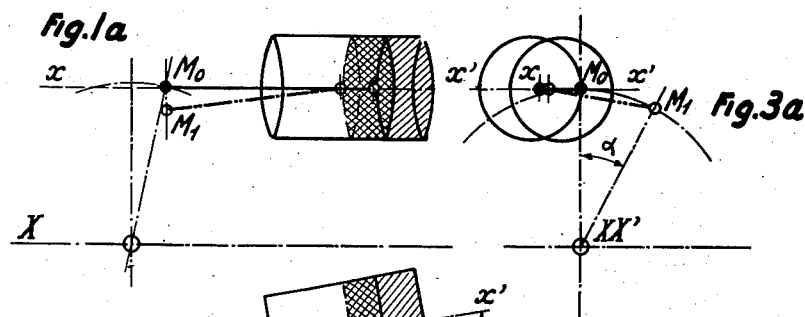
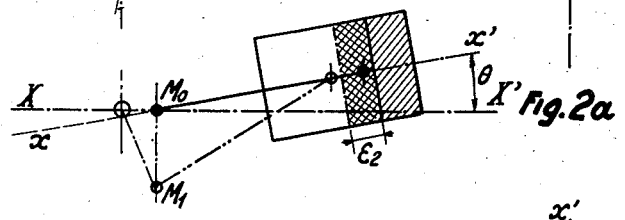
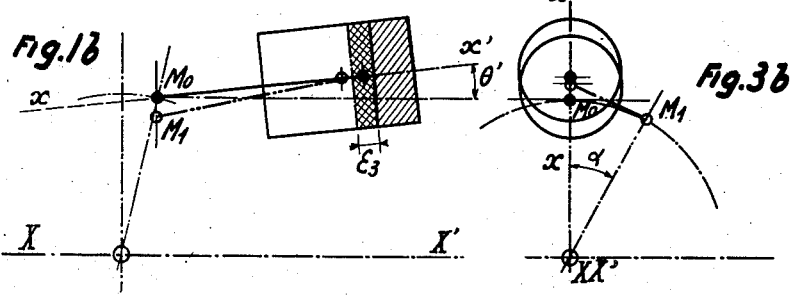
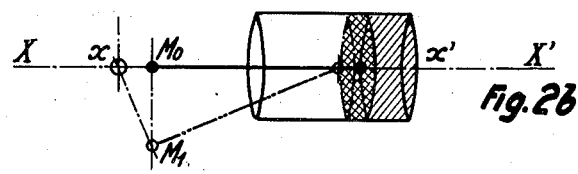
INVENTOR
Rene Devillers
By Watson, Cole, Grindle & Watson

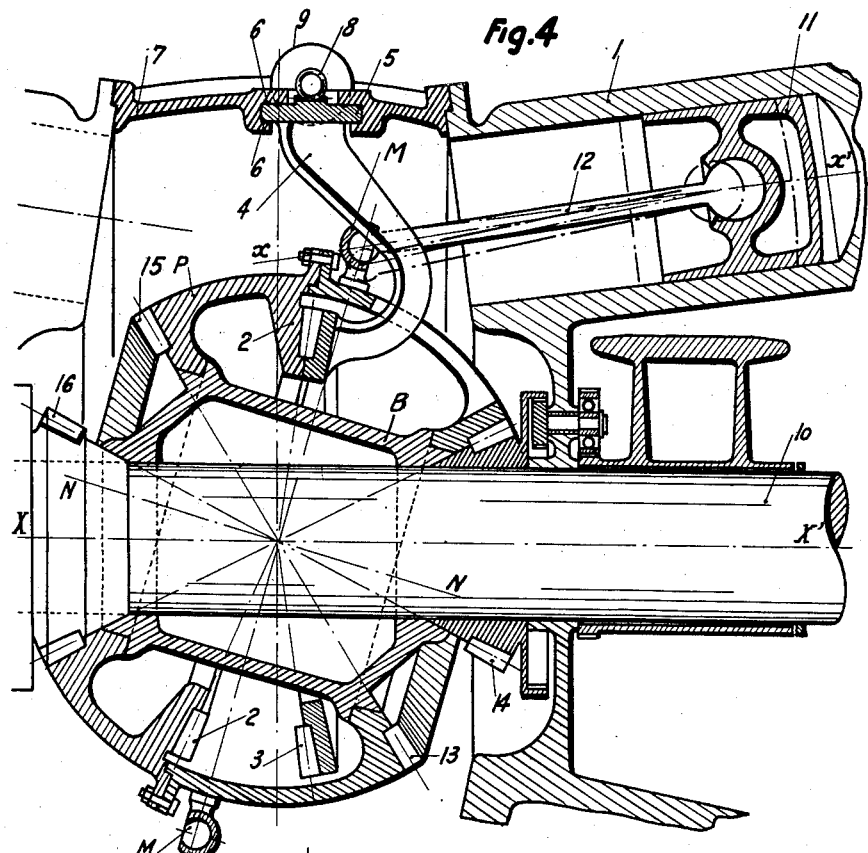
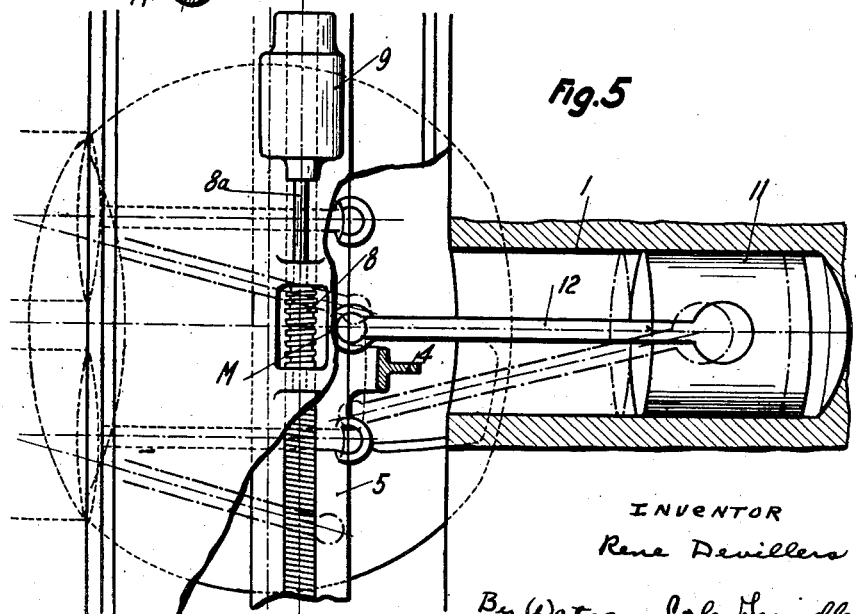

Patented Oct. 2, 1951

2,569,559

UNITED STATES PATENT OFFICE 2,569,559

ADJUSTABLE POWER TRANSMISSION

René Devillers, Paris, France, assignor to Societe Anonyme des Ateliers d'Aviation Louis Breguet, Paris, France, a company of France Application August 13, 1946, Serial No. 690,319
In France September 12, 1942

3 Claims. (Cl. 74—60)

This invention relates to an adjustable transmission applicable to the adjustment of the compression ratio in internal combustion engines of the kind having a plurality of cylinders arranged around the axis of the driving shaft, each cylinder having a reciprocatory piston, the reciprocatory motion of which is translated into rotary motion of the driving shaft by means of a swash plate or equivalent member connected by rods and universal joints with said pistons.

It is an object of my invention to provide a simple transmission mechanism associated preferably with a particular arrangement of the cylinders allowing adjustment of the volumetric compression ratio of the engine during operation. This possibility shows a particular interest in the case of modern aircraft engines fed through an injection of gasoline and the timing of which is shifted so as to allow the scavenging of the burnt gases at the end of the exhaust.

A very high power with a moderate maximum pressure without any substantial increase in temperature may be obtained at the start or under any other circumstances with a low volumetric compression ratio and a considerable pressure at the admission as provided by the supercharging compressor of the engine. The specific consumption of fuel is then comparatively high.

On the contrary the maximum volumetric compression ratio will be associated with a reduced admission and a moderate over-pressure of the compressor, corresponding to the most favorable cruising speed.

Exceptionally low specific consumption may under these conditions be obtained without any knocking.

According to this invention, said adjustable transmission comprises a system of parts adapted to produce a relative angular shifting, around the axis of the engine shaft, between, on one hand the group of cylinders and, on the other hand the swash plate, preferably by shifting, around the axis of the engine shaft the part by which said swash plate is prevented from turning around its axis, such as a stationary gear member with which said swash plate meshes and which absorbs the reaction of the torque. Said shifting may be carried out by any suitable means, preferably by a worm gear device controlled by electric power means.

In order to increase the adjusting effect of said shifting, the axes of the engine cylinders may be slightly inclined with respect to the axis of the driving shaft. Said increase attains its maximum efficiency if the axes of the cylinders are situated according to generatrices of a one nappe hyperboloid of revolution, the axis of which is the axis of the driving shaft, that is to say are not coplanar with the axis of the driving shaft.

Obviously my invention covers also the particular case where the axes of the cylinders are exactly parallel with the axis of the engine. In this case the shifting of the dead points is due merely to the variations in obliquity of the connecting rods and the ratio between the extreme volumetric ratios depends directly on the maximum obliquity.

If the axes of the cylinders are inclined, the path is furthermore shifted to the extent of the projection on the axis of the cylinders of the displacement of the connecting rod heads caused by adjustment. Obviously, this additional action is brought to a maximum considerable value when the axes of the cylinders are inclined with reference to the corresponding meridian planes.

The following description given out by way of example and by no means in a limiting sense will allow the invention and its execution to be more readily understood, the features appearing both in the specification and in the drawings forming of course part of my invention.

Figs. 1, 2 and 3 are diagrammatic sections respectively in elevational plane and end views illustrating the principle of the invention, for the case where the axes $x-x'$ of the cylinders are parallel to the longitudinal axis $X-X'$ of the engine.

Figs. 1a, 2a, 3a are similar views corresponding to the case where the axes $x-x'$ of the cylinders are arranged round the axis of the engine according to generatrices of a one nappe hyperboloid of revolution.

Figs. 1b, 2b, 3b relate to the case where the axes $x-x'$ of the cylinders are arranged on a cone surface.

Fig. 4 is a partial sectional view along the axis of an engine the swash plate of which is provided with an arrangement in accordance with my invention.

Fig. 5 is a plan view, partly in section, of said engine, shown in Fig. 4.

The angular shifting of the stationary ring, used for the rolling of the plate, produces the same movement for the plate carrying the head M of the connecting rods.

In the diagram I have supposed that the slope of the connecting rods is nil at the inner dead center which corresponds to maximum compression, said condition being always applicable. If for a different setting the obliquity assumes a different value different of zero, it will be generally very small and nothing is changed in the general conclusions to be made.

In the case of Figs. 1, 2 and 3 the axes of the cylinders are parallel to the axis of the engine.

During operation and for the position corresponding to the inner dead center, the head of the connecting rod passes from $Mo$ to $Ml$ while describing round the axis of the engine an arc of circle the angular displacement $a$. This displacement lying in a plane which is perpendicular to the axes of the cylinders, the shifting $\Sigma_1$, of the inner dead center is due only to the obliquity assumed then by the connecting rod. For instance with a maximum obliquity of about 18° it is possible to lower the volumetric compression ratio from 8 to 5.5.

In the case of Figs. 1$a$, 2$a$, 3$a$, the axes $x$—$x'$ of the cylinders have slopes equal to $\theta$ with reference to the meridian planes passing through the original locations of the heads of the connecting rods, no conicity being provided.

For a same shifting angle $a$, (Fig. 3$a$) the receding movement $\Sigma_2$ of the inner dead center is much more important as the displacement of the connecting rod head is oblique with reference to the axis of the cylinder. It is thus possible to obtain a variation of the volumetric compression ratio which is much more considerable than in the first case, or else it is possible to obtain a same variation with a maximum obliquity of the connecting rod which is much smaller.

In the case of Figs. 1$b$, 2$b$, 3$b$, the axes of the cylinders are arranged in meridian planes but are inclined at an angle $\theta'$ with reference to the axis of the engine.

For a same shifting angle $a$, the displacement $\Sigma_3$ of the inner dead center is only a little above that obtained in the case of Figs. 1, 2 and 3. The component of the displacement of the connecting rod head along the axis of the cylinder, is as a matter of fact much smaller than in the case of Figs. 1$a$, 2$a$ and 3$a$.

To obtain the widest range of adjustment with the least obliquity of the connecting rods, it is therefore of interest to incline the axes of the cylinders in the meridian planes, said axes being thus arranged according to one system of generatrices of a one nappe hyperboloid of revolution.

With an inclination of the cylinder axes which does not exceed 10° it is therefore easy to modify for instance the volumetric compression ratio between 10 and 4 said range being sufficient for practical requirements.

Figs. 4 and 5 are axial cross-sectional and plan views of an example of execution applied to a transmission engine including a swash plate. Said swash plate P is rotatably borne on a cylindrical bearing B borne on the engine shaft 10 for relative rotation about said shaft, the axis NN of said bearing being at an angle with the axis of said shaft 10.

The axes $x$—$x'$ of the cylinders such as 1, are supposed to lie in meridian planes on the surface of a cone but it is also possible to imagine them to be parallel to the axis X—X' of the engine or arranged on a hyperboloid of revolution.

The bevel gear 2 which forms a part of the swash plate P and carries the heads M of the connecting rods, meshes with a second bevel gear 3 having an equal number of teeth which is located inside said swash plate and connected through arms 4 with an outer ring 5 coaxially located with reference to the axis X—X' and adapted to insure a small angular movement around said axis inside the guiding members 6 provided in the casing 7. This ring 5 carries outwardly a helical gear meshing with the worm 8.

The worm 8 which is of course nonreversible is driven by an electric motor 9 with an automatic switch off arrangement operated through contacting means at the end of the stroke.

The shaft 10 of the engine, the axis of which is shown at X—X' is driven at a reduced speed by the plate P which is controlled in its turn by the pistons 11 of the cylinders through the agency of the connecting rods 12; the drive of the shaft 10 is operated through the two double bevelled gears 13—14 and 15—16 controlled by the plate P, gears 14 and 16 being fixed to shaft 10. The direction of rotation of said shaft 10 is opposite to that of the normal line N—N to the mean plane of the plate.

The heads M of the connecting rods are uniformly distributed at the periphery of the plate P and are formed by universal joints; this also applies to the opposite ends of the connecting rods.

It is then apparent that when the worms rotate the bevel gear 3, the plate and the heads of the connecting rods are subjected to the same angular shifting as said gear and the dead centers are displaced as disclosed. Said angular shifting of said gear does not alter the rocking angle of the plate and consequently does not substantially modify the stroke of the pistons.

In Figs. 4 and 5, two positions of the connecting rods 12 which correspond to two angular positions of the bevel gear 3 have been shown respectively in full drawn lines and in dot and dash lines. On the left hand side of Fig. 5 are also illustrated two other connecting rods of the engine in two different positions.

Obviously the above described forms of execution have been given out solely by way of example and it is possible to modify them chiefly by way of substitution of equivalent means without departing from the scope of my invention as defined in accompanying claims.

What I claim is:

1. An adjustable power transmission comprising in combination a stationary casing, a shaft rotatably mounted in said casing, reciprocatory members mounted in said casing, a swash member mounted on said shaft, means connecting said reciprocatory members to said swash member to urge said swash member in unison with said reciprocatory members, means drivingly connecting said swash member with said shaft for converting the movement of said swash member into a rotary movement of said shaft, a bevel gear carried by said swash member coaxially therewith, a second bevel gear coaxial with said shaft, supported from said casing for angular displacement around its own axis and meshing with said first-mentioned bevel gear, and means borne on said casing for angularly adjusting the position of said second bevel gear around its axis whereby the angular position of said swash member around its own axis is varied.

2. An adjustable power transmission comprising in combination a stationary casing, a shaft rotatably mounted in said casing, reciprocatory members mounted in said casing, a swash member mounted on said shaft, means connecting said reciprocatory members to said swash member to urge said swash member in unison with said reciprocatory members, means drivingly connecting said swash member with said shaft for converting the movement of said swash member into a rotary movement of said shaft, a bevel gear carried by said swash member coaxially therewith, a second bevel gear coaxial with said shaft and meshing with said first-mentioned bevel gear, a ring coaxial with said shaft and supported from said casing for angular displacement around its own axis, means for rigidly connecting said ring to said second bevel gear, a gear carried by said ring, a worm mounted on said casing and meshing with said last-mentioned gear and means for rotating said worm whereby the angular position of said ring and second bevel gear around their common axis is adjusted.

3. An adjustable power transmission comprising in combination a stationary casing, a shaft rotatably mounted in said casing, reciprocatory members mounted in said casing, a swash member mounted on said shaft, means connecting said reciprocatory members to said swash member to urge said swash member in unison with said reciprocatory members, means drivingly connecting said swash member with said shaft for converting the movement of said swash member into a rotary movement of said shaft, a bevel gear carried by said swash member coaxially therewith, a second bevel gear coaxial with said shaft and meshing with said first-mentioned bevel gear, a ring coaxial with said shaft and supported from said casing for angular displacement around its own axis, means for rigidly connecting said ring to said second bevel gear, a gear carried by said ring, a worm mounted on said casing and meshing with said last-mentioned gear and an electric motor for rotating said worm whereby the angular position of said ring and second bevel gear around their common axis is adjusted.

RENÉ DEVILLERS.

REFERENCES CITED

The following references are of record in the file of this patent:

UNITED STATES PATENTS

| Number | Name | Date |
|---|---|---|
| 1,118,799 | Prott | Nov. 24, 1914 |
| 1,799,167 | Hulsebos | Apr. 7, 1931 |
| 1,825,691 | Hall | Oct. 6, 1931 |
| 1,869,440 | Schlenker | Aug. 2, 1932 |
| 1,885,323 | Duryea | Nov. 1, 1932 |
| 2,231,100 | Wahlmark | Feb. 11, 1941 |
| 2,240,912 | Porter | May 6, 1941 |
| 2,332,106 | Neuland | Oct. 9, 1943 |